(12) United States Patent
Kreiter et al.

(10) Patent No.: US 8,709,254 B2
(45) Date of Patent: Apr. 29, 2014

(54) HYBRID SILICA MEMBRANE FOR WATER REMOVAL FROM LOWER ALCOHOLS AND HYDROGEN SEPARATION

(75) Inventors: Rob Kreiter, Alkmaar (NL); Hessel Lennart Castricum, Amsterdam (NL); Jaap Ferdinand Vente, Alkmaar (NL); Johan Evert Ten Elshof, Enschede (NL); Maria Dirkje Anna Rietkerk, Barsingerhorn (NL); Henk Martin Veen, Alkmaar (NL)

(73) Assignee: Stichting Energieonderzoek Centrum Nederland, Petten (NL)

( * ) Notice: Subject to any disclaimer, the term of this patent is extended or adjusted under 35 U.S.C. 154(b) by 595 days.

(21) Appl. No.: 13/054,121

(22) PCT Filed: Jul. 14, 2009

(86) PCT No.: PCT/NL2009/050432
§ 371 (c)(1),
(2), (4) Date: Feb. 18, 2011

(87) PCT Pub. No.: WO2010/008283
PCT Pub. Date: Jan. 21, 2010

(65) Prior Publication Data
US 2011/0259825 A1    Oct. 27, 2011

(30) Foreign Application Priority Data

Jul. 14, 2008 (EP) .................................... 08160320

(51) Int. Cl.
| | |
|---|---|
| B01D 15/00 | (2006.01) |
| B01D 29/00 | (2006.01) |
| B01D 39/00 | (2006.01) |
| B01D 61/14 | (2006.01) |
| B01D 69/12 | (2006.01) |
| B01D 53/22 | (2006.01) |
| B01D 71/70 | (2006.01) |

(52) U.S. Cl.
USPC . 210/640; 210/500.25; 210/490; 210/500.27; 210/500.36; 95/45; 95/52; 95/55

(58) Field of Classification Search
USPC .......... 210/500.27, 500.25, 490, 640, 500.26, 210/500.36; 95/45, 52, 55; 427/244–245; 428/447, 622
See application file for complete search history.

(56) References Cited

U.S. PATENT DOCUMENTS 6,797,206 B1 * 9/2004 De Vos et al. ................ 264/45.1
6,866,697 B2 * 3/2005 Sammons et al. ................ 95/45

(Continued)

FOREIGN PATENT DOCUMENTS

| EP | 0 468 663 A2 | 1/1992 |
|---|---|---|
| JP | 2003-047831 * | 2/2003 |

(Continued)

OTHER PUBLICATIONS

J. K. Shea et al, Bridged Polysilses-quioxanes: Molecular Engineering of Hybrid Organic-Inorganic Materials; MRS Bulletin/May 2001.*

(Continued)

*Primary Examiner* — Ana Fortuna
(74) *Attorney, Agent, or Firm* — Jordan IP Law, LLC; Todd A. Vaughn

(57) ABSTRACT

A microporous organic-inorganic hybrid membrane based on silica of the invention has an average pore diameter of less than 0.6 nm, and comprises bridging organosilane moieties of the formula $\equiv O_{1.5}Si-CHR-SiO_{1.5}\equiv$ or $\equiv O_{1.5}Si-CH(CH_3)-SiO_{1.5}\equiv$. The membrane can be used in the separation of hydrogen from mixtures comprising hydrogen and $CH_4$, $CO_2$, $CO$, $N_2$, and the like, and in the separation of water from alcohols having 1-3 carbon atoms, optionally in the presence of an inorganic or organic acid.

17 Claims, 3 Drawing Sheets

(56) References Cited

U.S. PATENT DOCUMENTS

| | | | |
|---|---|---|---|
| 8,277,661 B2* | 10/2012 | Sah et al. | 210/652 |
| 2011/0259825 A1* | 10/2011 | Kreiter et al. | 210/651 |
| 2012/0055860 A1* | 3/2012 | Wyndham | 210/198.3 |
| 2013/0126432 A1* | 5/2013 | Kreiter et al. | 210/640 |

FOREIGN PATENT DOCUMENTS

| | | | |
|---|---|---|---|
| JP | 2004-275943 | * | 10/2004 |
| WO | WO 99/61140 | * | 12/1999 |
| WO | WO 2007/081212 A1 | | 7/2007 |
| WO | WO 2010/008283 | * | 1/2010 |

OTHER PUBLICATIONS

H. L. Castricum et al., "Hydrothermally Stable Molecular Separation Membranes From Organically Linked Silica", Jour. of Mat. Sci., vol. 18, Mar. 14, 2008; pp. 2150-2158.

H. L. Castricum et al., "Hybrid Ceramic Nanosieves: Stabilizing Nanopores With Organic Links", Chem. Comm., Feb. 1, 2008, pp. 1103-1105.

K. J. Shea et al., "Bridged Polysilsesquioxanes: Molecular Engineering of Hybrid Organic-Inorganic Materials", Mrs. Bull., May 2001, pp. 368-376.

K. J. Shea et al., "Bridged Polysilsesquioxanes: Molecular Engineering of Hybrid Organic-Inorganic Materials", Chem. of Mat. Am. Chem. Soc., vol. 13, Sep. 27, 2001, pp. 3306-3319.

K. J. Shea et al., "Bridged Polysilsesquioxanes: Molecular Engineering of Hybrid Organic-Inorganic Materials", Chem. Rev., Jul. 8, 1995, pp. 1431-1442.

* cited by examiner

US 8,709,254 B2

HYBRID SILICA MEMBRANE FOR WATER REMOVAL FROM LOWER ALCOHOLS AND HYDROGEN SEPARATION

CROSS REFERENCE TO PRIOR APPLICATIONS

The present application is a National Stage Application of PCT International Application No. PCT/NL2009/050432 (filed on Jul. 14, 2009), under 35 U.S.C. §371, which claims priority to the European Patent Application No. 08160320.1 (filed on Jul. 14, 2008), which are each hereby incorporated by reference in their respective entireties.

The invention relates to a microporous organic-inorganic hybrid membrane having pore sizes below 0.6 nm, suitable for gas and liquid separations and to a process for producing such a membrane.

BACKGROUND

Lower alcohols, such as methanol, ethanol and propanol, are increasingly applied as sustainable transport fuels. The production of these alcohols poses new separation challenges. As an example, the production of ethanol in fermentation reactions results in concentrations of 5-15% of ethanol in an aqueous mixture. Selective removal of the ethanol from this fermentation mixture is difficult, because of the presence of acidic components and fouling agents such as yeast and high-molecular components of the bio-feedstock. Distillation of such mixtures results in ethanol/water mixtures that still contain at least 4% of water, due to the ethanol/water azeotrope. Water/alcohol mixtures of varying ratios, for example containing 1-15% of water, can be purified using water selective membranes.

The state-of-the-art microporous pure silica membranes have shown good separation properties in both gas and liquid separations, but suffer from hydrolysis due to strong interaction with adsorbed water at relevant operation temperatures (95° C. and above). This led to rapid degradation of the microporous structure and loss of selectivity. De Vos et al., 1999; EP-A 1089806) developed hydrophobic silica membranes (also referred to as methylated silica membranes) for separation of gases and liquids and proposed a method for reducing water molecule interaction by incorporation of a precursor containing hydrophobic methyl groups. Methylated silica membranes were further studied for the dehydration by pervaporation of organic solvents by Campaniello et al., 2004. They found that the loss of water selectivity could be retarded by increasing the methyl content (hydrophobicity) of the membranes. Using this approach it was possible to achieve a satisfactory performance up to temperatures of 95° C. However, these membranes are not stable at higher temperatures, which are necessary for efficiently separating water from organic solvents. As a result the observed selectivity decreases, leading to failure within a few weeks at temperatures above 95° C.

Recent work on zeolite NaA and NaY membranes has shown that separation factors ranging from 100-10000 can be achieved with acceptable water fluxes (Ahn, 2006). However, the long-term stability of zeolite membranes under these conditions has not been demonstrated. In contrast, it was shown by Li et al., 2006, that several zeolite membranes such as MOR and MFI do not show stable performance when subjected to hydrothermal conditions. In addition to the limited fluxes, significant reductions of the fluxes were observed in a period of 50 days. Furthermore, it is well-known that the pH range in which zeolite membranes can be applied is limited, because of hydrolytic degradation (Caro J., 2005). Such zeolite membranes are therefore not suited for separating water from alcohol/water mixtures containing acidic components.

More recent investigations have shown that organic-inorganic hybrid silica membranes based on mixtures of the precursors 1,2-bis(triethoxysilyl)ethane (BTESE) and methyltriethoxysilane (MTES) are suitable for the separation of water from several organic solvents, including n-butanol (Castricum et al., Chem. Commun. 2008, 1103-1105; J. Mater. Chem. 2008, 18, 1-10, Sah et al., WO 2007/081212). The long-term stability of these membranes was unprecedented in literature. Membrane life-times up to at least two years were demonstrated at an operating temperature of 150° C. However, subsequent investigations showed that the separation factors of membranes based on BTESE/MTES mixtures in the dehydration of methanol, ethanol, and propanol were disappointing (vide infra).

BRIEF DESCRIPTION OF FIGURE DRAWINGS

DESCRIPTION OF THE INVENTION

Figure 1:
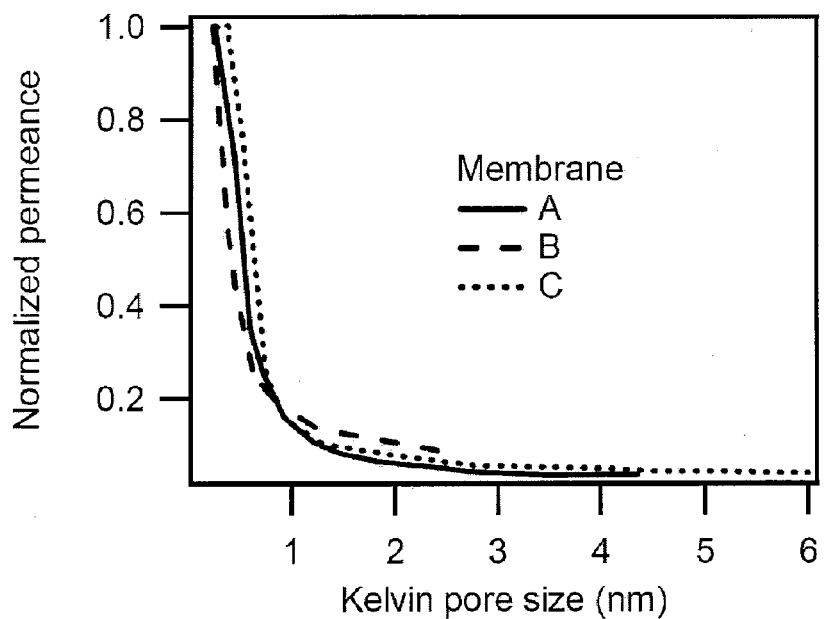
FIG. 1 shows the pore size distribution of membrane A together with those of a methylated silica membrane and hybrid silica membrane prepared according to the prior art (De Vos, Sah). Further details are reported by Kreiter (2009).

It was found that a microporous organic-inorganic hybrid membrane based on silica with an average pore diameter of 0.1-0.6 nm, which is hydrothermally stable in several media up to at least 200° C., can be produced using sol-gel processing of short-chain bridged silanes and is suitable for the separation of gases and the removal of water and other small molecular compounds from a range of organic compounds, including low molecular weight alcohols. Furthermore, it was found that for the formation of suitable pore diameters, templates and the introduction of non-bridging precursors are not needed and undesired. The membranes of the invention comprise bridging organo-silane moieties of the formula:

$$\equiv O_{1.5}Si-CHR-SiO_{1.5}\equiv \qquad [I]$$

which can also be represented with the formula:

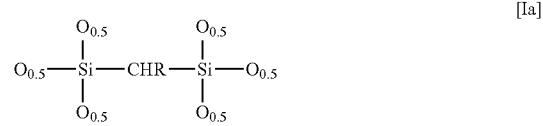

in which R=H or $CH_3$, preferably H; and the number 1.5 in formula [I] means that on each Si atom on average about 1.5 oxygen atom is present. In formula [Ia], the symbol $O_{0.5}$ means that the oxygen atom is also bound to a further silicon atom. Thus, on average, each silicon atom is connected to one methylene (or ethylidene) group and to three oxygen atoms, and each oxygen atom is connected to two silicon atoms in the bulk of the material. In other words, on every three Si—O—Si link, there is about one Si—CHR—Si link present in the material of the membrane of the invention. Hence the gross chemical formula of the silane of the membrane of the invention is $[Si_2O_3(CHR)]_n$ or preferably $[Si_2O_3(CH_2)]_n$. As minor deviations from the precise ratios do not detract significantly from the properties of the membranes, the gross formula is to be understood as the proportional formula $SiO_{1.3-1.7}C_{0.3-0.7}H_{0.6-1.4}$ (or $SiO_{1.3-1.7}C_{0.6-1.4}H_{1.2-2.8}$) or preferably $SiO_{1.4-1.6}C_{0.4-0.6}H_{0.8-1.2}$.

The membranes or molecular separation membrane layers of the invention are of an amorphous material with a disordered array (as distinct from a periodic array) of micropores with a pore size below 1.0 nm, especially below 0.8 nm and particularly centred between 2 and 6 Å, especially between 3 and 6 A. In this description pore sizes are defined as the average pore size obtained from a Kelvin pore size distribution as measured by permporometry. As an advantage of the invention, the membranes have a narrow pore size distribution; in particular, the pore size distribution, determined as described below, is such that pores sizes of more than 125% of the average pore size are responsible for less than 20%, or even for less than 10% of the total permeance. In a particular embodiment, the permeance through these membranes through pores larger than 1.0 nm is less than 10% of the total permeance, more in particular the permeance through pores having a pore size of more than 0.8 nm is less than 10% of the total permeance. The Kelvin pore size and Kelvin pore size distribution are determined by permporometry, i.e. the gas permeance from a gas-vapour (adsorbing/condensing) gas is measured as a function of the relative pressure of the vapour. In this way progressive pore blocking by the adsorbing vapour is followed. This can be related to a pore size, assuming cylindrical pores, by recalculating the relative vapour pressure to a length scale by using the Kelvin equation:

$$d_k = -4\gamma v_m / RT\ln\left(\frac{p}{p_0}\right),$$

where $d_k$ is the pore diameter, $\gamma$ the surface tension, $v_m$ the molar volume, R the gas constant, T the temperature, p the (partial) vapour pressure and $P_0$ the saturated vapour pressure. As average pore size was taken the pore size at which half of the initial permeance under dry conditions was blocked by the vapour. Water was used as an adsorbing/condensing vapour and He as the non-adsorbing gas similar to e.g. Tsuru, 2001, or Huang, 1996, or Deckman (US patent application 2003/0005750).

The porosity of the membranes is typically below 45%, e.g. between 10 and 40%, which is also indicative of a disordered array, since ordered arrays (crystals) usually have porosities above 50%.

The membranes (or microporous membrane layers) can have a thickness of e.g. between 20 and 2000 nm, and are preferably supported, e.g. on a mesoporous (pore diameter between 2.0 and 50 nm) ceramic layer that has preferably been deposited on a macroporous support (pore diameter larger than 50 nm). This mesoporous layer can comprise materials such as gamma-alumina, titania, zirconia, and organic-inorganic hybrid silica and mixtures of these. The macroporous support can be a ceramic material such as alpha-alumina, or a metallic material such as stainless steel.

The upper temperature limit of the hydrothermal stability of the microporous membranes of the invention in alcohol/water mixtures is at least 200° C. As a measure of hydrothermal stability, they show a stable separation performance in the dehydration of butanol at 150° C., i.e. their separation performance in the dehydration using pervaporation of n-butanol containing 1 to 10 wt % water does not alter by more than 0.03%/day between 50 and 230 days of operation at 150° C.

It was found to be important that the hydrolysis is carried out in the substantial absence of surfactants such as long-chain alkyl ammonium salts (cationic) or block copolymer polyalkylene oxides or long-chain alkyl polyalkylene oxides (non-ionic) or long-chain alkane-sulphonates (anionic) and the like. Such surfactants should therefore preferably not present above a level of 0.1% (w/w) of the reaction mixture, more preferably below 100 ppm or best be completely absent.

The membranes according to the invention can be used to separate relatively small molecules such as $NH_3$, $H_2O$, He, $H_2$, $CO_2$, CO, $CH_3OH$, from larger molecules in the liquid or the gas phase. However, the membranes of the invention are remarkably suitable for separating very small molecules such as $H_2$ and He from molecules having at least one atom from the second or higher row of the periodic system. For example, the membranes can be used for separating hydrogen from one or more of the components $CH_4$, $CO_2$, CO, $N_2$, $CH_3OH$, $NH_3$, $CH_3F$, $CH_2F_2$, $C_2H_4$, $C_2H_6$ and related compounds or other trace components and their respective multicomponent mixtures.

On the other hand, the membranes of the invention are very suitable for separating small molecules such as $H_2O$ from molecules having at least two atoms from the second (Li—F) or higher (Na—Cl etc.) row of the periodic system. Specific examples include but are not limited to the separation of water molecules from small organic molecules such as $C_1$-$C_6$ hydrocarbons, halogenated, especially fluorinated hydrocarbons, ethers (especially dimethyl ether, aldehydes (e.g. acetaldehyde), ketones (acetone, methyl ethyl ketone), organic acids (formic, acetic, propionic, acrylic, or higher acids such as benzoic or terephthalic acid), amides (dimethyl formamide, dimethyl acetamide and N-methylpyrrolidone), aromatics (phenol, toluene) and alcohols. More specifically, the membranes according to the invention can be used for removal of water from methanol, ethanol, n-propanol and isopropanol, propanediol and butanediol. Especially preferred is the separation of water from bioethanol production processes. It was found that the separation of water from these lower alcohols is highly effective, even in the presence of inorganic acids such as hydrochloric acid, nitric acid, sulphuric acid, phosphoric acid or organic acids, such as formic acid, acetic acid, lactic acid, glutamic acid, succinic acid, levulinic acid, propanoic acid, butanoic acid, and longer homologues, and methane-sulphonic acid. The concentration of such acids in alcohol-water mixtures to be separated is preferably between 0.01 and 1 wt. %, more preferably between 0.025 and 5 wt. %, most preferably between 0.05 and 0.25 wt. %, on the basis of the weight of the mixture. The membranes can also suitable be used for dehydration of esterification processes.

The membranes of the invention preferably have a separation factor for a 95:5 mixture of water/alcohol of at least 10, preferably at least 15 for water/methanol and/or at least 150, preferably at least 250 for water/ethanol at a temperature of 5° C. below the boiling point of the mixture, under atmospheric pressure. In these separations, the separation factor, $\alpha$, is defined as:

$$\alpha = \frac{Y_w / Y_a}{X_w / X_a} \quad (1)$$

where Y and X are the weight fractions of water (w) and alcohol (a) in the permeate and feed solutions, respectively.

The membranes can be combined to multiple units and incorporated in downstream installations of production processes, e.g. of biodiesel production, other alcohol production or recovery processes, oil refinery, esterification processes, etc. in a manner known per se for separation membranes.

The membranes can be produced essentially by the method described in WO 2007/081212 and Castricum et al., *J. Mater. Chem.* 2008, 18, 1-10.

In short, the membranes of the invention can be produced by a process comprising:

hydrolysing a silicon alkoxide of the formula (II)

(R'O)$_3$Si—CHR—Si(OR')$_3$, (II)

wherein R is H or CH$_3$, and R'=C$_1$-C$_6$ alkyl, especially C$_1$-C$_4$ alkyl, preferably methyl or ethyl, in an organic solvent to produce a sol of modified silicon (hydr)oxide;

depositing modified silicon (hydr)oxide from said sol onto a mesoporous support;

drying the deposit and calcining at a temperature between 100 and 500° C., preferably between 200 and 400° C.

The starting bis-silyl compounds of formula II can be produced by methods known in the art, or are commercially available. Corriu et al., 1998, describe the synthesis of inter alia bis(triethoxysilyl)methane and 1,1-bis(triethoxysilyl)ethane. It was found surprisingly that extensive purification of the starting bis-silyl compounds, for example using distillation, is not necessary for obtaining optimum performance of the resulting membrane, which constitutes an advantage of the process of the invention over known processes for producing microporous membranes.

In addition to the bis-silyl compounds of formula II, minor amounts of other silyl alkoxides, especially of the formulas (R'O)$_4$Si (TEOS), (R'O)$_3$S$_1$—CH$_3$ (MTES), (R'O)$_3$Si—CHR—Si(OR')$_2$—CHR—Si(OR')$_3$ or (R'O)$_3$S$_1$—CH$_2$—CH$_2$—Si(OR')$_3$ may be present; however, it is preferred that such secondary components are used, if at all, at levels of no more than 25 mole %, preferably no more than 10 mole % with respect to the compound(s) of formula II.

The hydrolysis is carried out in an organic solvent such as ethers, alcohols, ketones, amides etc. Alcohols related to the alkoxide groups of the precursors, such as methanol, ethanol, and propanol, are the preferred solvents. The organic solvent can be used in a weight ratio between organic solvent and silane precursor of between 10:1 and 1:1, more preferably between 3:1 and 2:1. The hydrolysis is carried out in the presence of water and, if necessary, a catalyst. The preferred molar ratio of water to silicon is between 1 and 8, more preferred between 2 and 6.

A catalyst may be necessary if hydrolysis in neutral water is too slow. An acid is preferably used as a catalyst, since an acid was found to assist in producing the desired morphology of the membrane. The amount of acid is preferably between 0.001 and 0.1 moles per mole of water, more preferably between 0.005 and 0.5 mole/mole.

The reaction temperature can be between 0° C. and the boiling temperature of the organic solvent. It is preferred to use elevated temperatures, in particular above room temperature, especially above 40° C. up to about 5° C. below the boiling point of the solvent, e.g. up to 75° C. in the case of ethanol. It was found to be important that the hydrolysis is carried out in the absence of surfactants such as long-chain alkyl ammonium salts (cationic) or blocked polyalkylene oxides or long-chain alkyl polyalkylene oxides (non-ionic) or long-chain alkane-sulphonates (anionic) and the like. Such surfactants should therefore preferably not be present above a level of 0.1% (w/w) of the reaction mixture, more preferably below 100 ppm or best be completely absent.

The drying and/or calcination of the deposit is preferably carried out under an inert, i.e. non-oxidising atmosphere, for example under argon or nitrogen. The calcination temperature is at least 100° C., up to about 600° C., using a commonly applied heating and cooling program. The preferred range for the drying and calcination temperature is between 150 and 500° C., more preferred between 200 and 450° C. It was found that membranes have sufficient thermal stability up to at least 450° C. The porosity of the membranes can be tuned by selecting the appropriate hydrolysis conditions, and the appropriate consolidation parameters (drying rate, temperature and rate of calcination). Higher temperatures typically result in smaller pore sizes.

EXAMPLES

Example 1

Production of a Hybrid Organic-Inorganic Sol and Membrane

The precursor BTESM (bis-triethoxysilylmethane, Gelest, purity 97%) was used as received. Ethanol (Merck, p.a.) was used as received. The precursor was dissolved in ethanol and cooled to 0° C. To this solution HNO$_3$ (65 wt %, Aldrich) diluted with water was added dropwise, while stirring. The mixture was refluxed for 3 h, after which the reaction was stopped by cooling in an ice bath.

The ranges of molar ratios uses were [H$_2$O]/[BTESM]=2-6, [H$^+$]/[BTESM]=0.05-0.5, [Si]=0.5-2.5 M. These ratios include the amount of water introduced with the concentrated HNO$_3$. As a typical example, membrane A was based on a sol composition of [H$_2$O]/[BTESM]/[H$^+$]=5/1/0.15. This sol was coated on tubular γ-alumina substrates using methods described elsewhere by Campaniello (2004). The resulting coated tubes were heat-treated in N$_2$ atmosphere at 300° C. for 2 h, using 0.5°/min heating and cooling rates.

The hybrid silica layers thus produced exhibited average pore diameters ranging from 0.45-0.55 nm, determined by permporometry as described above. Pores above 1 nm were essentially absent. The average Kelvin pore size obtained from permporometry is similar to a hybrid silica membrane based on MTES/BTESE prepared according to Sah (Membrane B). The membranes of the current invention have a narrow pore size distribution and a very low defect density. The permeance at Kelvin pore sizes of larger than 1 nm is significantly lower than found for membranes prepared according to the state of the art (B and C). This implies that the pore size distribution of membrane A is narrower and the defect density is lower than that of membranes B and C.

Example 2

Pervaporation and Gas Permeation Tests Using Membrane A

Pervaporation tests were carried out using mixtures of alcohols (95 wt %) and water (5 wt %). The alcohols studied were n-butanol, n-propanol, ethanol, and methanol. As measurement temperature was taken a temperature of 5° C. below the boiling point of the mixture. For membrane A, the following separation factors (a) were found (table 1):

TABLE 1

| Mixture | α (Membrane A) | α (Membrane B) | α (Membrane C) |
|---|---|---|---|
| n-Butanol/water | 10500 | 360 | 3535 |
| n-Propanol/water | 6540 | 100 | 2414 |
| Ethanol/water | 890 | 15 | 157 |
| Methanol/water | 23 | 1 | 4 |

Compared to BTESE (Membrane C) and BTESE/MTES (Membrane B) membranes prepared according to Sah (see above), this is a dramatic increase in separation factor for the separation of an ethanol/water mixture.

Figure 2A:
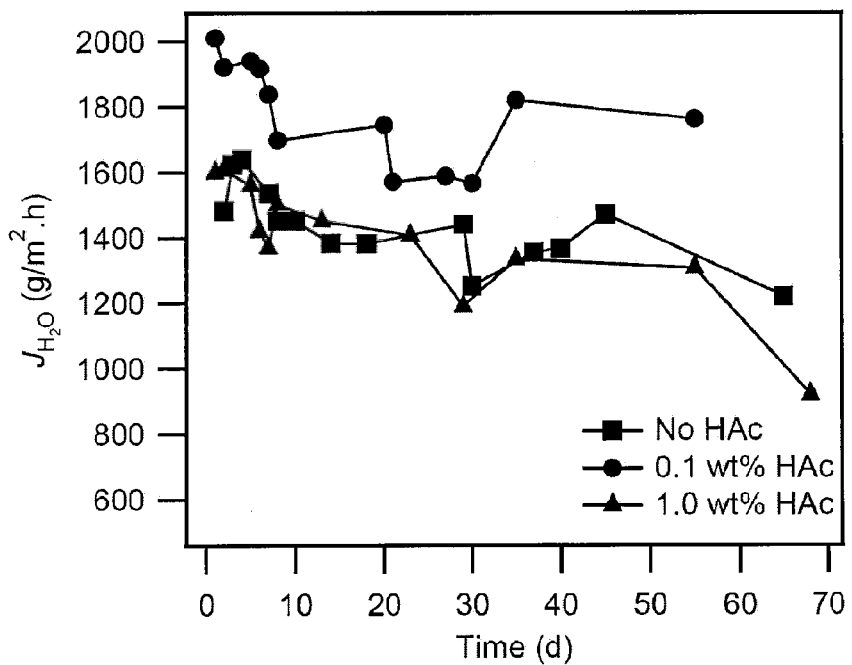
FIG. 2 shows the water flux and separation factor for pervaporation of EtOH/water (95/5 wt %) mixtures, containing no HAc, 0.1 wt % HAc, and 1.0 wt % HAc, respectively.
Figure 2B:
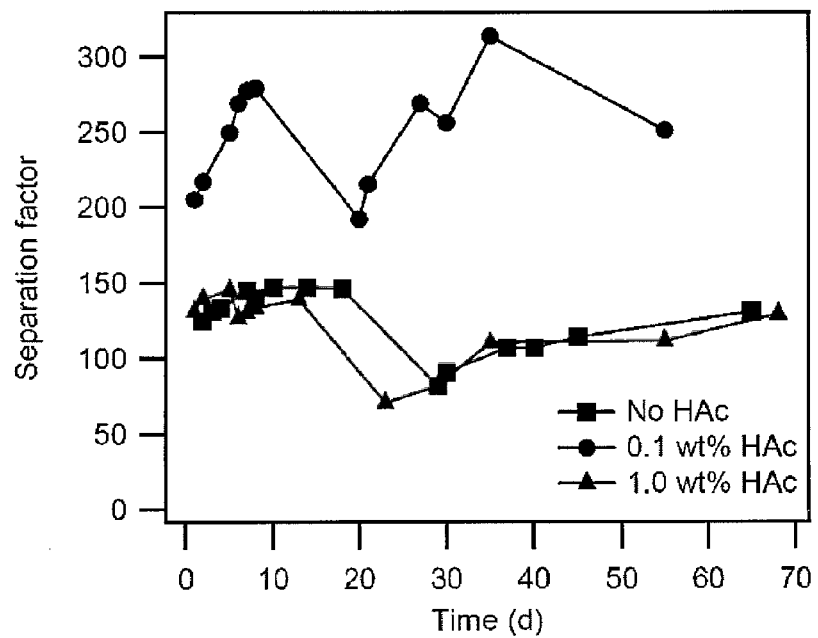
Figure 3:
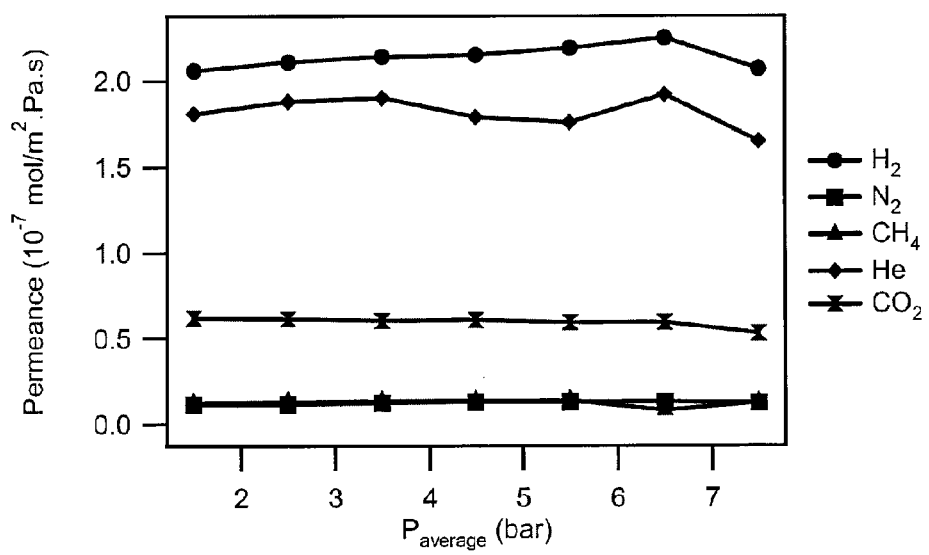
FIG. 3 shows gas permeation data obtained for membrane A at 200° C.
Figure 4:
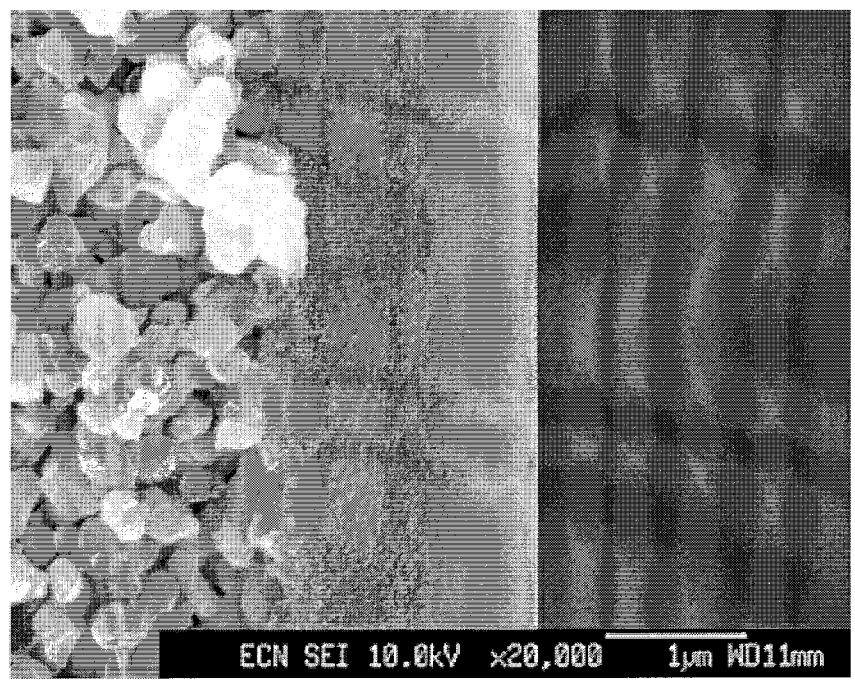
FIG. 4 shows SEM cross section of membrane A.

Pervaporation tests in mixtures of ethanol, water, and acetic acid (HAc) were done to determine acid stability. Mixtures of EtOH/water (95/5 wt %) were used, to which 0.1 or 1.0 wt % of HAc were added. It was shown that membranes according to the invention, performed the same as in EtOH/water (95/5 wt %) for a period of more than 60 days (FIG. 2). Similarly, a membrane according to the invention showed a stable separation factor for at least 30 days of measurement time in a mixture of EtOH/water (95/5%) containing 0.1 wt % of $HNO_3$.

Gas permeation tests were performed using $H_2$, He, $N_2$, $CO_2$, and $CH_4$. Permselectivity numbers were derived from single gas permeation experiments. The permselectivity is defined as the ratio of the permeance of the individual gases, measured in single gas permeation experiments. The following permselectivities for hydrogen were observed (Table 2). This indicates that a dramatic increase in selectivity was obtained for Membrane A compared to the state of the art membranes B and C. Clearly this is an effect of the narrow pore size distribution and the low defect density of membrane A.

TABLE 2

| Gas pair | Permselectivity (Membrane A) | Permselectivity (Membrane B) | Permselectivity (Membrane C) |
|---|---|---|---|
| $H_2/N_2$ | 18 | 4 | 4 |
| $H_2/CO_2$ | 3 | 2 | 2 |
| $H_2/CH_4$ | 14 | 1 | 3 |

REFERENCES

Ahn H., *Desalination,* 2006, 193, 244-251;
Campaniello et al., *Chem. Commun.,* 2004, 834-835;
Caro J., *Adsorption,* 2005, 11, 215-227;
Castricum et al., *Chem. Commun.* 2008, 1103-1105;
Castricum et al., *J. Mater. Chem.* 2008, 18, 1-10;
Corriu et al. *J. Organometallic Chem.* 562, 1998, 79-88;
De Vos et al., *J. Membr. Sci.* 158, 1999, 277-288;
Huang *J. Membr. Sci.* 1996, 116, 301-305;
Kreiter et al., ChemSusChem. 2009, 2, 158-160;
Li et al., *Trans. Mater. Res. Soc. Jpn.* 2006, 31 (2), 283-286;
Tsuru, *J. Membr. Sci.* 2001, 186, 257-265;
EP-A 1089806 (De Vos et al.);
US-A 2003/0005750 (Deckman);
WO 2007/081212 (Sah et al.).

The invention claimed is:

1. A microporous organic-inorganic hybrid membrane based on silica having an average pore diameter between 0.1 and 0.6 nm, and comprising bridging organosilane moieties of the formula $$\equiv O_{1.5}Si-CHR-SiO_{1.5}\equiv$$

in which R=H or $CH_3$.

2. The microporous organic-inorganic hybrid membrane of claim 1, wherein a permeance through pores of larger than 0.8 nm is less than 10% of the total permeance through the microporous organic-inorganic hybrid membrane.

3. The microporous organic-inorganic hybrid membrane of claim 1, wherein microporous organic-inorganic hybrid membrane is adapted to show stable separation performance in a dehydration of methanol, ethanol, propanol, butanol, and their respective isomers at temperature above 100 ° C.

4. The microporous organic-inorganic hybrid membrane of claim 1, wherein the microporous organic-inorganic hybrid membrane has a thickness at a microporous layer between 20 nm and 2 µm.

5. A composite membrane comprising:
a microporous organic-inorganic hybrid membrane based on silica having an average pore diameter between 0.1 and 0.6 nm, and comprising bridging organosilane moieties of the formula $$\equiv O_{1.5}Si-CHR-SiO_{1.5}\equiv$$

in which R=H or $CH_3$; and
a mesoporous support which supports the microporous organic-inorganic hybrid membrane.

6. The composite membrane of claim 5, wherein a permeance through pores of larger than 0.8 nm is less than 10% of the total permeance through the microporous organic-inorganic hybrid membrane.

7. The composite membrane of claim 5, wherein microporous organic-inorganic hybrid membrane is adapted to show stable separation performance in a dehydration of methanol, ethanol, propanol, butanol, and their respective isomers at temperature above 100 ° C.

8. The composite membrane of claim 5, wherein the microporous organic-inorganic hybrid membrane has a thickness at a microporous layer between 20 nm and 2 µm.

9. The composite membrane of claim 5, wherein the mesoporous support is selected from the group consisting of gamma-alumina, titania, zirconia, silica, and hybrid silica.

10. The composite membrane of claim 5, further comprising a macroporous carrier, wherein the mesoporous support is supported by the macroporous carrier.

11. A method of separating hydrogen from mixtures having hydrogen and at least one gaseous component, the method comprising:
providing a microporous organic-inorganic hybrid membrane based on silica having an average pore diameter between 0.1 and 0.6 nm, and comprising bridging organosilane moieties of the formula $$\equiv O_{1.5}Si-CHR-SiO_{1.5}\equiv$$

in which R=H or $CH_3$; and then
contacting the mixture and the microporous organic-inorganic hybrid membrane.

12. The method of claim 11, wherein the at least one gaseous component comprises one of $CH_4$, $CO_2$, CO, and $N_2$.

13. The method of claim 12, wherein:
providing a microporous organic-inorganic hybrid membrane further comprises supporting the microporous organic-inorganic hybrid membrane on a mesoporous support; and
contacting the mixture and the microporous organic-inorganic hybrid membrane further comprises contacting the mixture and the microporous organic-inorganic hybrid membrane supported by the mesoporous support.

14. A method of separating water from organic molecules, the method comprising:

providing a microporous organic-inorganic hybrid membrane based on silica having an average pore diameter between 0.1 and 0.6 nm, and comprising bridging organosilane moieties of the formula

in which R=H or $CH_3$; and then contacting the organic molecules and the microporous organic-inorganic hybrid membrane.

15. The method of claim 14, wherein the organic molecules are at least one alcohol having between 1 to 4 carbon atoms.

16. The method of claim 15, wherein the organic molecules comprises at least one alcohol having between 1 to 4 carbon atoms, wherein the at least one alcohol is in the presence of one of an inorganic and an organic acid.

17. The method of claim 14, wherein:

providing a microporous organic-inorganic hybrid membrane further comprises supporting the microporous organic-inorganic hybrid membrane on a mesoporous support; and contacting the organic molecules and the microporous organic-inorganic hybrid membrane further comprises contacting the organic molecules and the microporous organic-inorganic hybrid membrane supported by the mesoporous support.

* * * * *